United States Patent

[11] 3,554,174

[72] Inventor Lawrence G. Clawson
            Dover, Mass.
[21] Appl. No. 842,815
[22] Filed July 7, 1969
        Continuation-in-part of application Ser. No. 794,864, Jan. 29, 1969.
[45] Patented Jan. 12, 1971
[73] Assignee Dynatech Corporation
            Cambridge, Mass.
            a corporation of Massachusetts

[54] DUAL CIRCUIT INDUCTION SYSTEM
    16 Claims, 6 Drawing Figs.
[52] U.S. Cl. .................................................. 123/122,
                                    123/41.4, 123/127
[51] Int. Cl. ................................................. F02m 31/00,
                                    F01p 11/08, F02m 13/06
[50] Field of Search .................................. 261/41.4;
        123/122, 122A, 122A1, 122A2, 122A3, 122D, 127

[56]            References Cited
            UNITED STATES PATENTS
1,211,636  1/1917  Spray ........................... 48/180
1,865,514  7/1932  Godward ....................... 123/122
2,269,706  1/1942  Brown ........................... 123/122
2,323,639  7/1943  Anderson ...................... 123/127
2,402,080  6/1946  Randall ......................... 123/133
3,151,604  10/1964 Walker et al. ................. 123/119
3,171,395  3/1965  Bartholomew ............... 123/127
3,310,045  3/1967  Bartholomew ............... 123/127
3,338,568  8/1967  Goletsi ......................... 261/145
3,368,345  2/1968  Walker ........................... 60/30
3,374,991  3/1968  Walker ........................... 261/41
3,382,856  5/1968  McIlroy ......................... 123/127
3,461,850  8/1969  Oblander ...................... 123/122

OTHER REFERENCES
Product Engineering Aug. 14, 1967, page 46
Society of Automotive Engineers Paper No. 680108 1968

*Primary Examiner*—Wendell E. Burns
*Attorney*—Barnard, McGlynn and Reising

ABSTRACT: An improved induction system for internal combustion engines comprising a relatively large capacity throttle controlled ambient air induction circuit and a relatively small capacity unthrottled air induction circuit for high-temperature air, the air induction balance between the circuits being variable to automatically and continuously regulate engine inlet air temperature between a maximum at idle and a minimum at full load, and means for admitting fuel to the inlet in such quantities that the fuel-air ratio approaches the lean limit of combustibility corresponding to the inlet air temperature provided at each throttle setting across a wide range of engine operating conditions. Both carburetion and fuel injection systems are disclosed.

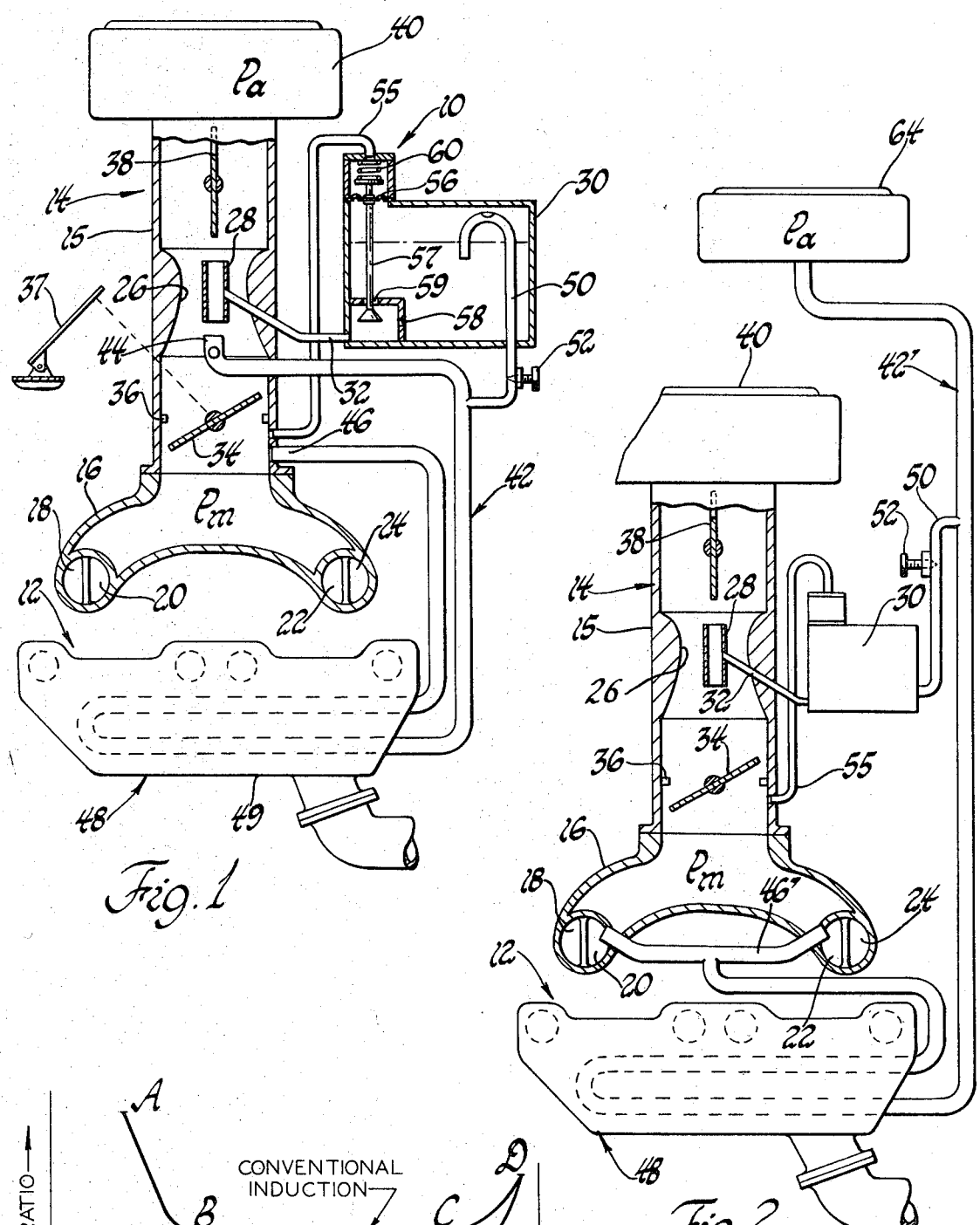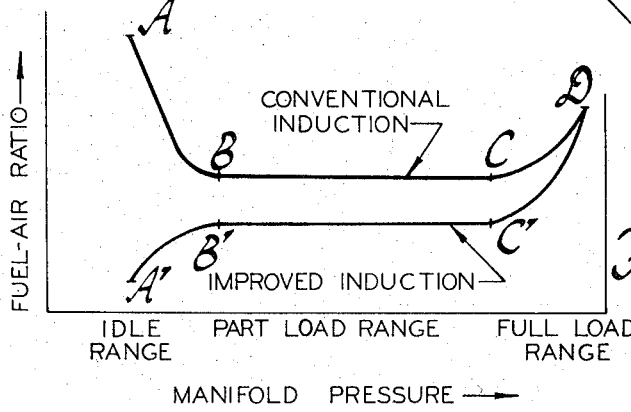

INVENTOR.
Lawrence G. Clawson
BY
Bernard, McGlynn & Reising
ATTORNEYS

DUAL CIRCUIT INDUCTION SYSTEM

This application is a continuation-in-part of application Ser. No. 794,864, Dual Circuit Induction System, filed Jan. 29, 1969, the entire disclosure of which is incorporated herein by reference.

This invention relates to induction systems for internal combustion engines and more particularly to a dual-circuit induction system for providing and automatically regulating a substantially elevated induction air temperature in accordance with engine inlet pressure and power output conditions over a wide range and supplying fuel to the inlet in such quantities that the fuel-air ratio approaches the combustible lean limit for any given inlet temperature and pressure condition. The dual-circuit induction system operating in this manner provides for satisfactory engine operation over a wide range at lean fuel-air ratios.

It is well known that satisfactory idle or minimum power operation of an internal combustion engine ordinarily requires admitting an inlet charge which is relatively rich; i.e. a fuel-air ratio which is significantly higher than the stoichiometric or "chemically correct" ratio of 0.067. there are several factors leading to this requirement but the fundamental factor is that a predetermined flame temperature must be maintained in the combustion chamber to support combustion of the fuel-air mixture. Since this flame temperature is an average of the burned and unburned charge portion temperatures, the predetermined temperature is ordinarily maintained by elevating the burned charge temperature at low-power operation by means of the admission of a rich fuel-air mixture.

It is also known that the admission of such rich mixtures under low power and part throttle operation of the engine tends to promote an exhaust which is high in unburned hydrocarbon content. To alleviate this condition, one prior art system of the carburetor type employs a small throttle bypass line having a preheater to vaporize the fuel at idle thereby to promote better fuel distribution. Improved fuel distribution and minimally elevated temperatures at idle do not represent a complete solution to exhaust pollutant problems in that such a system may yet require a rich idle mixture and does not relate the inlet temperature to inlet pressure and engine power outputs across a significant portion of the engine operating range.

Another prior art system proposes to regulate engine compression ratio across a range of power output conditions by effectively varying piston length. The theory of such a system is to maintain the necessary flame front temperature by increasing the temperature of the unburned charge portion thereby to permit lean fuel-air ratios. Such a system is inordinately complex in the mechanical sense and has yet to demonstrate any significant commercial practicality.

Still another prior art system employs a large primary circuit throttle bypass with a preheater for increasing charge temperature at idle and a dual-throttle linkage for relatively abruptly terminating airflow through the bypass at a predetermined part-throttle operating point. This system is generally applicable only to small displacement engines as the large bypass experiences poor heat transfer for low velocity airflow and further fails to continuously regulate engine inlet temperature in accordance with engine power output and inlet pressure across a large portion of the engine operating range. Moreover, a dual-throttle linkage is required to control the bypass airflow conditions as a function of the main throttle position such that the bypass throttle is relatively abruptly closed at the predetermined part-throttle setting.

In accordance with the present invention an internal combustion engine may be operated in such a fashion as to produce a significant reduction in air-contaminating exhaust constituents across a wide range of engine-operating conditions by substantially lowering the fuel-air ratios required for combustion without the need for compression ratio varying mechanisms or dual-throttle arrangements. In addition to reduction of objectionable exhaust constituents, this lowering of fuel-air ratios improves the thermal efficiency of the engine and thereby lowers the specific fuel consumption. In general, this is accomplished by continuously varying the temperature of air admitted to the engine from a maximum temperature substantially above the fuel vaporization point under low-power engine operation to a minimum temperature approaching ambient under high-power operation and admitting fuel to the engine in quantities such that the fuel-air ratio approaches the combustible lean limit for any given engine inlet temperature and pressure.

The invention is preferably carried out with induction apparatus including a first circuit for supplying air to the engine at ambient temperature and a second circuit for supplying air to the engine at substantially elevated temperatures, flow through the first circuit being primarily throttle regulated and flow through the second circuit being inlet pressure regulated such that the combined effect of the two circuits is to admit air in a continuously varying balance and at a net temperature which is automatically and continuously regulated between the maximum temperature at low-power operation and the minimum or ambient temperature at high-power operation. The apparatus for carrying out the invention includes means for admitting fuel to the inducted air in such quantities that the fuel-air ratio approaches the combustible lean limit for any given inlet temperature and pressure. This means for metering fuel may take a variety of forms including both carburetor and injector types of apparatus.

It has been found that the second or high-temperature air circuit is preferably restricted in size to produce the desired mean inlet temperature at the various engine-operating speeds and manifold pressures. An exhaust gas-type heat exchanger for the second induction circuit may be advantageously employed as the restriction and heat source to elevate the temperature of air flowing therethrough.

In all forms of the invention the automatic regulation of inlet air temperature at substantially elevated levels in accordance with inlet pressure and engine output power together with the admission of fuel in such quantities that the fuel-air ratios approach the combustible lean limit substantially reduces the production of exhaust constituents which are generally regarded as atmospheric contaminants. Various other features and advantages of the invention will become readily apparent upon reading of the following specification which describes illustrative embodiments of the invention. This specification is to be taken with the accompanying FIGS. of which:

FIG. 1 is a schematic view partly in section of a first embodiment of the invention employing a carburetor;

FIG. 2 is a schematic view partly in cross section of a second embodiment of the invention employing a carburetor;

FIG. 3 is a graph of fuel-air ratios versus manifold pressure of an engine employing a conventional induction system and an engine employing the invention.

Figure 4:
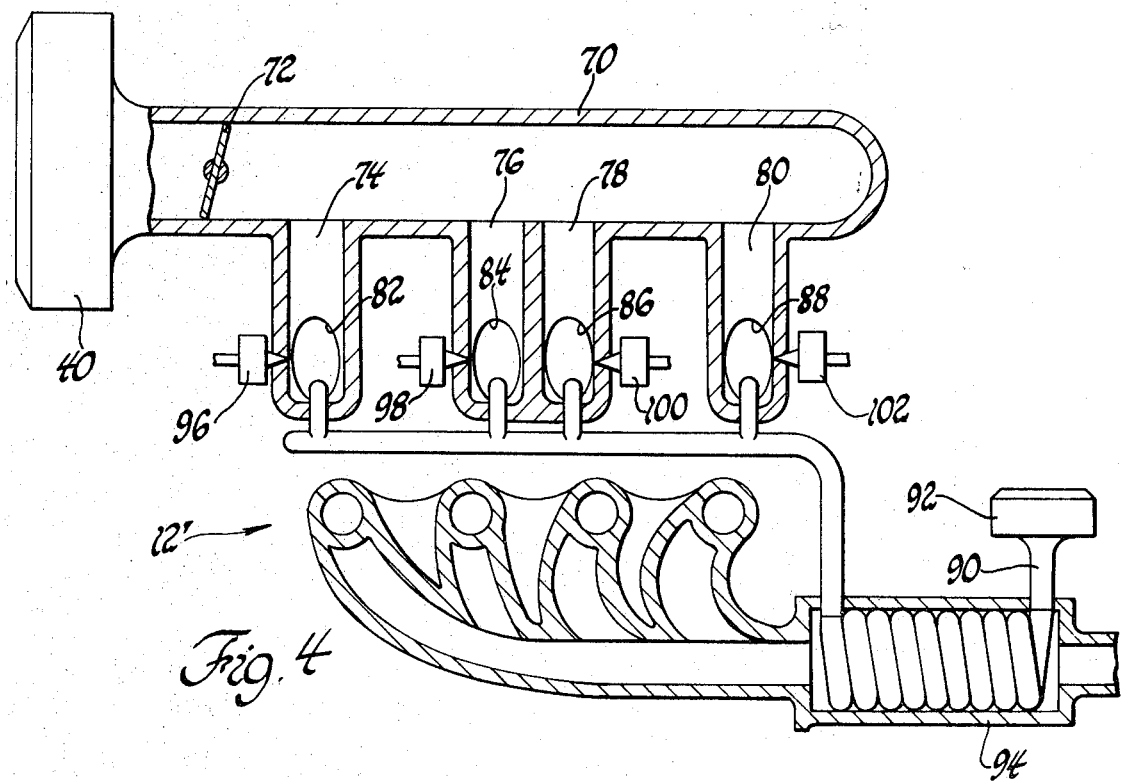
FIG. 4 is a schematic view partly in cross section of a third embodiment of the invention employing fuel injectors.

Referring now to FIG. 1 there is shown a carburetor-type, dual-circuit induction system 10 for an internal combustion engine schematically represented at 12. FIG. 1 represents a bank of four cylinders, or half of a V-8 engine. However, it will be understood that the invention may be applied to engines of any number and arrangement of cylinders. The dual-circuit induction system 10 includes a generally conventional downdraft carburetor 14 having a cylindrical body portion 15 which for purposes of this description defines a primary induction circuit. Body portion 15 has an inlet communicating with a supply of ambient temperature and pressure air $P_a$, and an outlet communicating with an engine inlet manifold 16. The manifold 16 branches into two paths each of which supplies a fuel-air mixture to two combustion chambers (not shown). The ports communicating with the chambers are numbered 18, 20, 22, and 24. The variable pressure which exists in the manifold is identified by $P_m$.

Carburetor 14 is provided with a constriction 26 forming a main venturi to produce an increase in the velocity of air flowing downwardly through body 15 and an amplifying venturi 28 disposed midway within the construction 26 to determine the rate at which fuel flows thereto from a supply 30 in the form of a carburetor float bowl. Amplifying venturi 28 is not required in many carburetors and should be considered an optional part. Supply 30 is connected to venturi 28 through a fuel line 32.

Carburetor 14 is also equipped with a pedal-controlled pivotal throttle plate 34 having a seat 36. Plate 34 is adapted to be rotated between a fully closed position and a fully opened position in response to depression of the pedal 37. Throttle plate 34 is disposed downstream of the venturi 28 and operates in the conventional fashion to regulate airflow through the body 15 and is matched with the seat 36 to insure a substantially closed condition when the throttle pedal 37 is in the undepressed or "idle" position. Carburetor 14 may also be equipped with a choke 38 and a conventional air cleaner 40 both of which operate in a well-known manner.

To vary the rate at which fuel is metered into the venturi 28 from fuel supply 30 a conventional "economizer" system may be employed. This system includes an unregulated orifice 58 for supplying fuel adequate to meet part-load operation demands and a regulated orifice 59 which opens to meet high-load demands. To regulate orifice 59, a pressure-monitoring tube 55 communicates manifold pressure to the upper surface of a small annular diaphragm 56. The diaphragm 56 operates in conjunction with a light spring 60 to control the position of a reversely tapered valve rod 57 within orifice 59. Accordingly, the position of valve rod 57 within the orifice 59 determines the rate at which fuel may flow therethrough in response to the flow-rate signal from venturi 28. In general, increasing manifold pressure opens orifice 59 to supply fuel in increasing quantities to satisfy the demands of high-load performance of engine 12. It is to be understood than an economizer system is not necessary to the operation of the invention, but may form part of the apparatus to which the invention is applied.

System 10 also includes a secondary induction circuit 42 defined by a small diameter tube having an inlet 44 which is disposed in the carburetor body 15 spaced downstream of the venturi 28 by one to three tube diameters but upstream of the throttle plate 34, and one or more outlet ports 46 reentering the primary flow circuit downstream of throttle plate 34. Between the inlet 44 and the outlet ports 46, secondary circuit 42 passes through a heat exchanger 48 which is associated with the exhaust manifold 49. Means other than exhaust gases may be employed to heat secondary circuit 42; for example, an electric heater or afterburner.

Fuel is supplied to the secondary circuit 42 from the main supply 30 through an idle line 50 having a manually regulable needle valve 52. This valve 52 is set to provide fuel to the circuit 42 in lean fuel-air ratios as is hereinafter described with respect to FIGS. 3, 5, and 6. Various other fuel-metering systems may also be employed; for example, line 50 may be connected directly to carburetor 14 or to the manifold 16. Idle line 7 is preferably provided with an air bleed to prevent siphoning.

As suggested in FIG. 1, the capacity of secondary circuit 42 is considerably less than that of the primary circuit defined by carburetor body 15 to supply from the secondary circuit approximately the air required for engine operation at engine idle and deceleration (i.e., at substantially closed throttle in the primary circuit). Accordingly, at low-power operation, the flow velocity through the secondary circuit 42 is quite high thereby to promote good heat transfer through the heat exchanger 48 to the air flowing through the secondary circuit.

In operation, the system of FIG. 1 admits air to the inlet ports 18, 20, 22, and 24 in varying quantities and at ambient temperature trough the carburetor 14. Air is also admitted to the inlets in varying quantities and at substantially elevated temperatures through the secondary circuit 42. At idle and low-power engine operation, the principal airflow is through secondary circuit 42 and thus the inlet air temperature is at maximum. As the engine 12 operates at higher power conditions and the manifold pressure rises, flow through carburetor 14 increases such that the net inlet air temperature gradually decreases due to the increasing portion of air at ambient temperature. Accordingly, the net inlet air temperature is continuously regulated in accordance with engine power output conditions.

FIG. 2 shows an alternative embodiment of the invention as applied to a carburetor-type system. This embodiment includes a standard downdraft carburetor 14 having a cylindrical body 15 defining a primary circuit having a main venturi 26, a fuel metering venturi 28, and a fuel supply 30. The primary circuit of carburetor 14 is equipped with a throttle plate 34 having a seat 36 upon which the throttle 34 is adapted to close. Fuel from supply 30 is metered into the optional amplifying venturi 28 through fuel line 32 in response to varying airflow through the venturi 28. The fuel-air mixture flows past throttle plate 34 to the manifold 16 and thence to the engine 12 through inlet ports 18, 20, 22, and 24 in the fashion described with reference to FIG. 1.

In addition, an unthrottled secondary circuit 42' has the inlet end in communication with a source of ambient air and the outlet end connected directly in communication with inlet ports 18, 20, 22, and 24 by means of branches 46'. Mediate the inlet and outlet ends of secondary circuit 42' an exhaust manifold heat exchanger 48 preheats the charge flowing through secondary circuit 42' to a temperature of approximately 300° F. or higher. The inlet end of secondary circuit 42' may be equipped with a small air cleaner 64. In addition, an idle circuit including line 50 having a manually set needle valve 52 is connected between the fuel supply 30 and the secondary circuit 42' to provide fuel for idle and light-load operation of the engine 12. The function of the apparatus shown in FIG. 2 is identical to that of FIG. 1 and will not be repeated.

The operation of the dual-circuit induction system of FIGS. 1 and 2 as contrasted with the operation of a conventional induction system may be described with reference to FIG. 3. Referring to the "conventional induction" plot of FIG. 3, the idle or light-load operation of the typical internal combustion engine is generally characterized by a rich fuel-air mixture as shown at point A. At point A, the fuel-air mixture in pounds of fuel per pound of air may be as high as 0.10. This rich fuel-air mixture is required in the conventionally inducted engine due to the fact that (1) the manifold pressure $P_m$ does not provide an adequate driving force to exhaust gases from the combustion chambers during the exhaust cycle, resulting in the build up of so-called "residuals" in the combustion chamber, and (2) the primary carburetor airflow rates may be such that the fuel in a cold charge is not evenly distributed among the various combustion chambers of a multicylinder engine.

In the part-load range between points B and C of FIG. 3, the scavenging and distribution difficulties described above are alleviated due to increased manifold pressures and higher airflow rates. Accordingly, the fuel-air mixture may be leaned out to a typical value as low as 0.06. In the full-load range, a comparatively rich mixture is again required to provide maximum engine performance. This is represented by point D of the plot of FIG. 3, which typically is a fuel-air mixture of about 0.08. Since the conventional engine spends a predominate amount of operating time between points A and B, the rich mixtures typical of this range tend to produce a high quantity of unburned hydrocarbon and carbon monoxide constituents in the exhaust gases.

The operation of an internal combustion engine employing the improved systems of FIGS. 1 and 2 will now be described with reference to the "improved induction" curve of FIG. 3. Specific reference is made to FIG. 1 with the understanding that the description is equally applicable to FIG. 2 insofar as function is concerned.

At idle or in the light-load operating condition, throttle 34 is fully closed and seated on seat 36 thus preventing any air from flowing through the primary circuit defined by carburetor 14. Accordingly, little or no fuel passes through line 32. However, a large differential exists between $P_a$ and $P_m$ providing a high driving force for air through the secondary circuit 42. A lean mixture quantity of fuel as defined by point A' of FIG. 3 is admitted into the air flowing through secondary circuit 42 by way of valve 52 in line 50. This relatively small quantity of charge passes through the heat exchanger 48 where it is raised in temperature to approximately 300° F. or more before being admitted back into the primary circuit downstream of throttle plate 34. Heating the charge to a temperature substantially above fuel vaporization temperature increases $P_m$ substantially above the conventional idle manifold pressure and vaporizes the fuel in the secondary charge. This vaporized and preheated charge is admitted into the combustion chambers through the inlet ports 18, 20, 22, and 24. Because of the increased manifold pressure $P_m$, an extremely high inlet charge temperature, and fuel vaporization, a lean mixture, for example 0.045, may be employed in the idle and light-load operation of the engine 12. The fuel vaporization insures substantially perfect fuel mixture distribution and the elevated manifold pressure $P_m$ promotes improved scavenging and removal of the aforementioned residuals, and the elevated inlet air temperature lowers the lean combustible limit of the fuel-air charge.

In the part-load range between points B' and C' of FIG. 3, throttle plate 34 assumes a partly open position as shown in FIG. 1. In this condition, the differential between $P_a$ and $P_m$ provides a reduced driving force for the charge through secondary circuit 42 resulting in decreased flow rates. Accordingly, the total charge provided to the engine through inlet ports 18, 20, 22, and 24 is distributed between the primary circuit of carburetor 14 and the secondary circuit 42. The elevated temperature charge which flows through the unthrottled secondary circuit 42 and heat exchanger 48 mixes with the unheated charge flowing through primary circuit 14 downstream of the throttle 34 to provide a turbulent mixing effect between the preheated and unheated charge portions. Due to the mixing of the preheated and unheated charges the engine with which the FIG. 1 apparatus is employed may run efficiently on a reduced fuel-air ratio as shown between points B' and C' of FIG. 3. A ratio of approximately 0.04 to 0.055 may be employed for operation within this range.

In the full-load range, throttle 34 may be fully opened to admit the entire charge through the primary circuit of carburetor 14 to the inlet ports 18, 20, 22, and 24. Under these conditions, manifold pressure $P_m$ rises to approximately equal the ambient pressure $P_a$ thereby substantially equalizing the pressures on opposite ends of the secondary circuit 42. Accordingly, there is little or no force to drive a charge portion through secondary circuit 42. With the rise in manifold pressure $P_m$ operating through the pressure-sensing tube 55 upon the diaphragm 56 the orifice 59 may be fully opened to admit a relatively large quantity of fuel through the fuel line 32 to provide a relatively rich charge to the engine. This operating point is again represented by point D of FIG. 3 which is common to both the "conventional" and "improved" induction plots of FIG. 3.

To summarize the operation of the FIGS. 1 and 2 apparatus, for idle and light-load conditions, throttle plate 34 is closed thus requiring all fuel-air mixture to be admitted to the engine 12 through the secondary circuit 42. Air entering the inlet 44 is mixed with fuel provided by the fixed valve 52 in the idle line 50 to form a lean charge which is preheated in heat exchanger 48. This lean preheated charge is admitted through ports 46 to the manifold 16 resulting in a higher than normal idle manifold pressure $P_m$ and a preheated fuel-air mixture. Under full throttle conditions, throttle 34 is fully opened and $P_m$ approximately equals $P_a$ thereby eliminating the driving force on secondary circuit 42 and admitting a relatively rich cool charge through primary circuit 14 to the manifold 16. In the part-load range throttle 34 assumes an intermediate position and the manifold pressure differential automatically produces a balance in the charge portions flowing through the primary circuit 14 and the secondary circuit 42.

Under transient conditions wherein a rapid opening of throttle 34 results in a rapidly increasing manifold pressure $P_m$, substantially all fuel in route to the engine 12 may be temporarily trapped in the secondary circuit 42. To relieve engine operation problems resulting from this condition, the static transfer port 54 in the portion of secondary circuit 42 within the carburetor body 15 permits this fuel to be dumped back into the primary circuit to improve the response of the engine to the rapidly opening throttle condition. Although the FIG. 1 apparatus is shown with an ambient air supply it is apparent that a supercharger for driving air into the carburetor throat may be employed. The operation of the apparatus is exactly the same as previously described the only difference being an increase in the value of $P_a$ with a corresponding increase in the pressure differentials under the various operating conditions.

Both the embodiments of FIGS. 1 and 2 illustrate the use of the idle fuel line 50 connecting the supply 30 to the secondary circuits 42 and 42'. This fuel introduction directly into the second circuit may be of advantage under certain engine-operating condition; i.e. during engine deceleration, but it is to be understood that the invention as applied to carburetion systems is not limited to the direct introduction of fuel into the secondary circuit. On the contrary, fuel may be admitted to the total inducted air mixture downstream of the throttle 34 either in the carburetor body 15 or in the manifold 16. Various instrumentalities for metering fuel into the inducted air will be apparent to those skilled in the art.

In the embodiments of FIGS. 1 and 2 a substantial reduction in the unburned hydrocarbon content of the engine exhaust under deceleration conditions may be realized. This is due to the fact that under medium or full-load operation, the exhaust gases become very hot and the flow of air through the secondary circuit of the subject invention is relatively small. Accordingly, an extremely high-temperature secondary airflow is produced. This extremely hot air may be rapidly drawn into the engine during the deceleration mode since the throttle 34 is rapidly closed forcing the principal airflow to the engine through the secondary circuits 42 and 42' of FIGS. 1 and 2, respectively. This extremely hot air tends to maintain a high inlet temperature which aids combustion of the lean idle fuel-air mixture which is admitted during the deceleration mode. This advantage is realized whether or not the fuel line 50 is connected directly to the secondary circuit; however, the advantage is maximized when the fuel line 50 is so connected since the fuel flow is automatically increased in proportion to the flow through the secondary circuit.

Referring now to FIG. 4 the invention is illustrated as applied to an engine 12' having a fuel injection system. The system includes a primary air induction conduit 70 having an inlet for taking in air at atmospheric pressure and at ambient temperature. Conduit 70 is provided with a throttle 72, the position of which is controlled by a pedal and suitable linkage. Conduit 70 is provided with a plurality of ports 74, 76, 78, and 80 communicating with suitable manifold conduits to direct the inducted air into the inlets 82, 84, 86, and 88 of the engine 12'. Conduit 70 is provided with a suitable air cleaner 40 of the same type as that shown in FIGS. 1 and 2.

The fuel injection system of FIG. 4 also includes a small diameter secondary induction conduit 90 having an inlet communicating with air at atmospheric pressure and ambient temperature. The inlet is adapted to receive a suitable air cleaner 92. Conduit 90 passes through an exhaust gas-type heat exchanger 94 en route to the engine inlets 82, 84, 86, and 88. Accordingly, air at substantially elevated temperatures is provided to the inlets by way of secondary conduit 90. As is the case with the apparatus of FIGS. 1 and 2, the secondary circuit 90 is preferably unthrottled such that flow is regulated by engine inlet pressure.

Fuel is metered directly into the inlets 82, 84, 86, and 88 by means of fuel injectors 96, 98, 100, and 102 which may be of the solenoid type. Suitable fuel injection systems are available from Bosch and Bendix. The preferred system is that used on the 1970 model Volkswagen. The inducted air with which the metered fuel is mixed enters the inlets 82, 84, 86, and 88 at a temperature which is continuously varied over a wide range in accordance with the power requirements, that is, inlet pressure and rotating speed, of the engine 12'.

Figure 5:
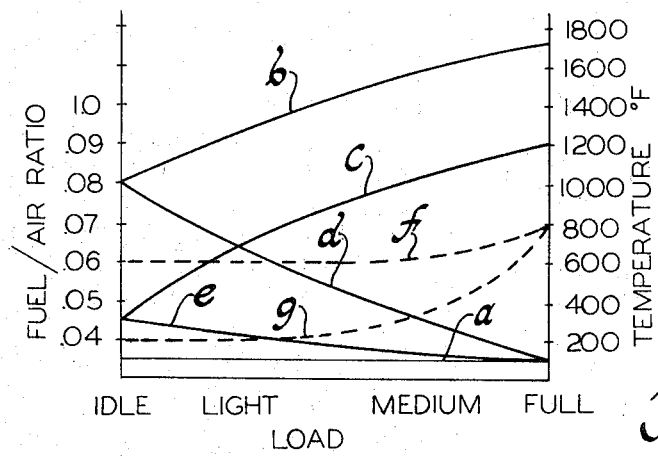
FIG. 5 is a composite graph illustrating the relationship between engine-operating range, fuel-air ratio and inlet temperature of an engine employing the invention.
Figure 6:
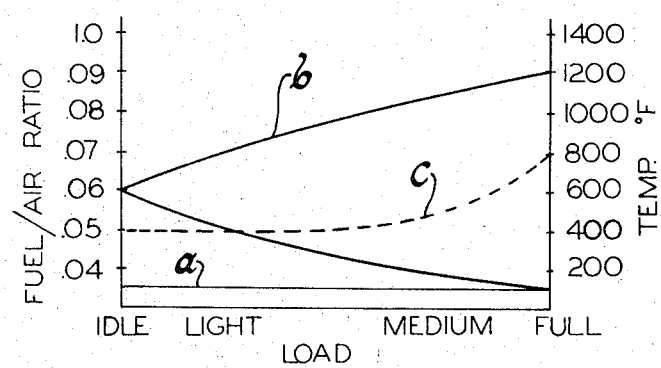
FIG. 6 is an operating graph similar to FIG. 4 of the operating characteristics of an illustrative engine employing the invention.

Referring now to FIGS. 5 and 6, the operation of the embodiments of the invention shown in FIGS. 1, 2, and 4 are described in greater detail. The primary circuits of the illustrated embodiments induct air into the engine at the relatively constant atmospheric or ambient temperature as illustrated by line *a* of FIGS. 5 and 6. Air inducted into the engine through the secondary circuits of the illustrated embodiments enters the engine after passing through the heat exchanger at a substantially elevated temperature in the range between 300° F. and 100° F. at idle, up to a maximum temperature under full-load conditions which is limited only by the temperature of the exhaust gases and the efficiency of the heat exchanger. Maximum temperatures between 1,200° F. and 1,700° F. are obtainable. The range of secondary air temperatures is indicated by the region between lines *b* and *c* of FIG. 5. Accordingly, the temperature of the total inducted air at the inlet of the engine resulting from the mixture of the ambient primary air and heated secondary air is automatically regulated and varied in accordance with engine operation within the range defined by the lines *d* and *e* of FIG. 5. As illustrated, the net inlet air temperature at idle is between 300° F. and 1,000° F. and this temperature continuously decreases toward full-load or full-power engine operation until it approaches the temperature of the ambient air *a* inducted through the primary induction circuits. Fuel is admitted to the engine in such quantities that the fuel-air ratio approaches the lean limit of combustibility corresponding to operating inlet temperature and pressure over the entire operating range of the engine as shown by the region between lines *f* and *g* of FIG. 5. In all portions of the operating range where the temperature of the inducted air mixture is substantially above ambient, such operation will result in satisfactory engine operation with a lean fuel-air charge. Accordingly, at idle the fuel-air ratio of the engine employing the invention is between 0.04 and 0.06 measured in pounds of fuel per pounds of air. Ratios in this range at idle are substantially less than the stoichiometric or "chemically correct" ratio of 0.067. As shown in FIG. 5, the fuel-air ratio for light-load and medium-load operation remains in the range between 0.040 and 0.06, the range finally converging on a maximum fuel-air ratio of approximately 0.07 at full-load operation.

The operation of a typical engine equipped with an induction system constructed and arranged in accordance with the invention is shown in FIG. 6. Again, air is admitted at atmospheric pressure and ambient temperature through the primary induction circuit as illustrated by line *a* of FIG. 6. The temperature of air which is admitted through the secondary circuit varies from a minimum temperature of 600° F. to a maximum temperature of 1,200° F. between idle and full-load operation, respectively, as shown by line *b* of FIG. 6. Accordingly, the temperature of the mixture of primary and secondary air which is admitted to the engine inlet varies between 600° F. at idle and ambient temperature under full load operation as shown by line *c* of FIG. 6. The fuel-air ratio is accordingly varied between 0.05 at idle to approximately 0.55 at medium load and then rises to a maximum of 0.07 for full-load operation. This is shown by line *d* of FIG. 6.

The foregoing description of the operation applies with equal accuracy to the carburetor and fuel injector systems illustrated and described herein. In either type of system, the air inlet temperature is substantially elevated and automatically regulated throughout a wide range across the range of engine operating conditions in such a fashion as to eliminate the need for complex throttle linkages and other elaborate equipment. It is to be understood that heating means other than exhaust-temperature, but the minimum temperatures described herein are to be preserved irrespective of the type of heating means used. It is to be understood that the foregoing descriptions are intended for purposes of illustration and are not to be construed in a limiting sense.

I claim:

1. Apparatus for regulating the induction air inlet temperature of an internal combustion engine having at least one combustion chamber and an inlet thereto over a range of engine-operating conditions comprising: a first induction circuit for admitting air at ambient temperature and in variable quantities to the inlet over the power range of the engine, means disposed in the first induction circuit for selectively and variably throttling the air admitted therethrough to operate the engine over the power range, a second induction circuit of substantially lesser flow capacity then the first of substantially lesser flow capacity than the first induction circuit for admitting air at substantially elevated temperatures and in variable quantities to the inlet over the power range of the engine, heating means associated with the secondary circuit for substantially elevating the temperature of air flowing therethrough (between minimum and maximum temperatures,) to a sufficient temperature that the net temperature of the air admitted to the inlet is no less than 400° F. under low power condition, the flow rate through the secondary circuit being regulated by the pressure conditions at the inlet such that the temperature of the total air admitted to the inlet varies continuously with continuously varying load between a maximum temperature (defined by the temperature of the air in the secondary circuit) of at least 400° F. under minimum engine power operation and a minimum temperature approaching ambient temperature under maximum engine power operation, and metering means for admitting fuel to the inlet (in variable quantities such that the fuel-air ratio at the inlet approaches the combustible lean limit for any given inlet temperature and pressure), Said metering means being regulable to meter fuel to the engine in such quantities as to provide an air-fuel ratio of approximately 20 to 1 over a substantial portion of the engine-operating range.

2. Apparatus as defined in claim 1 wherein the heating means is constructed and arranged such that the (maximum) temperature of the air admitted to the inlet under low-power conditions is in the range substantially between 400° F. and 1,000° F.

3. Apparatus as defined in claim 1 wherein the means for admitting fuel is arranged such that the fuel-air ratio under minimum and part-load engine power operating condition is in the range between approximately 0.06 and 0.04.

4. Apparatus as defined in claim 1 wherein the first induction circuit includes a carburetor having a body portion mounted on the engine.

5. Apparatus as defined in claim 4 wherein the means for admitting fuel includes a first fuel line connected to the body portion for admitting fuel thereto in quantities related to the airflow therethrough.

6. Apparatus as defined in claim 5 including a second fuel line connected to the secondary circuit for admitting fuel thereto in quantities related to the airflow therethrough.

7. Apparatus as defined in claim 1 wherein the heating means includes a heat exchanger heated by the exhaust gases of the engine.

8. Apparatus as defined in claim 7 wherein the heating means is arranged such that the temperature of the air in the secondary circuit has a minimum temperature in the range between 600° F. and 1,000° F. and a maximum temperature approaching the temperature of the exhaust gases.

9. Apparatus as defined in claim 1 wherein the means for admitting fuel comprises an injector device operatively associated with the inlet for metering fuel thereto in varying quantities.

10. A method of operating an internal combustion engine having at least one combustion chamber inlet comprising the conditions, continuously varying the temperature of air admitted to the inlet from a maximum temperature of at least 400° F. under low-power engine-operating conditions, to a minimum temperature approaching ambient under high-power engine-operating conditions, and admitting fuel to the inlet in such quantities that the fuel-air ratio of the charge in the inlet is approximately 0.05 over a substantial portion of the engine-operating range.

11. A method of operating an internal combustion engine having at least one combustion chamber inlet comprising the steps of: continuously varying the temperature of air admitted to the inlet with varying engine-operating conditions from a maximum temperature in the range between approximately 400° F. and 1,000° F. under low-power engine-operating conditions to a minimum temperature approaching ambient under high power engine operating conditions, and admitting fuel to the inlet in such quantities that the fuel-air ratio of the charge in the inlet is approximately 0.05 over a substantial portion of the engine-operating range.

12. The method defined in claim 11 wherein the fuel-air ratio under maximum inlet temperature conditions is in the range between approximately 0.04 and 0.06.

13. A method of operating an internal combustion engine having at least one combustion chamber inlet comprising the steps of: operating the engine between low and high-power conditions, continuously regulating the temperature of air at the inlet by supplying air at ambient temperature to the inlet in varying quantities related to engine power through a first throttled induction circuit, supplying air at temperatures elevated to at least approximately 600° F. to the inlet in varying quantities related to inlet pressure through a second induction circuit, mixing the air supplied to the inlet to produce a net inlet temperature which varies continuously from a maximum temperature of at least approximately 400° F. under low-power conditions to a minimum approaching ambient under high-power conditions, and admitting fuel to the inlet air in such quantities that the fuel-air ratio of the charge in the inlet is approximately 0.05 over a substantial portion of the engine-operating range.

14. A method of operating an internal combustion engine having at least one combustion chamber inlet comprising the steps of: operating the engine between low and high-power conditions, continuously regulating the temperature of air at the inlet by supplying air at ambient temperature to the inlet in varying quantities related to engine power through a first throttled induction circuit, supplying air at temperatures elevated to at least approximately 600° F. to the inlet in varying quantities related to inlet pressure through a second induction circuit, mixing the air supplied to the inlet to produce a net inlet temperature which varies continuously from a maximum temperature of at least approximately 400° F. under low-power conditions to a minimum approaching ambient under high-power conditions, and admitting fuel to the inlet air in such quantities that the fuel-air ratio is less than 0.06 over a substantial portion of the operating range of the engine.

15. The method defined in claim 14 wherein the fuel is admitted directly into the first and second induction circuits in respective quantities related to the quantities of air flowing therethrough.

16. The method defined in claim 14 wherein the fuel is injected into the inlet of the engine.